United States Patent
Dolan et al.

(10) Patent No.: US 7,595,951 B2
(45) Date of Patent: Sep. 29, 2009

(54) HEAD-SPECIFIC STANDBY MODES FOR DISK DRIVE PREAMPLIFIERS AND THE LIKE

(75) Inventors: Daniel J. Dolan, Cottage Grove, MN (US); David W. Kelly, Lino Lakes, MN (US); Stephen C. Kuehne, Rosemount, MN (US); Nathan M. Rudd, Hastings, MN (US); Ross S. Wilson, Menlo Park, CA (US)

(73) Assignee: Agere Systems Inc., Allentown, PA (US)

( * ) Notice: Subject to any disclaimer, the term of this patent is extended or adjusted under 35 U.S.C. 154(b) by 561 days.

(21) Appl. No.: 11/445,535

(22) Filed: Jun. 2, 2006

(65) Prior Publication Data

US 2007/0279785 A1    Dec. 6, 2007

(51) Int. Cl.
*G11B 15/12* (2006.01)
(52) U.S. Cl. .......................................... 360/62; 360/61
(58) Field of Classification Search ....................... None
See application file for complete search history.

(56) References Cited

U.S. PATENT DOCUMENTS 7,324,299 B1 * 1/2008 Schreck et al. ................ 360/75
2003/0156343 A1 * 8/2003 Freitas et al. .................. 360/46

* cited by examiner

*Primary Examiner*—Jason C Olson
(74) *Attorney, Agent, or Firm*—Mendelsohn, Drucker, & Associates, PC; Steve Mendelsohn (57) ABSTRACT

A (e.g., hard-disk drive (HD)) system supports reader standby mode and/or writer standby mode. For reader standby mode, reader circuitry in the system's preamplifier is transitioned to a low-power mode during write operations. To provide quick transition from write mode to read mode, the reader circuitry is transitioned to pre-read mode before the end of the write operation. For writer standby mode, the preamplifier's writer circuitry is transitioned to a low-power mode during read operations. To provide quick transition from read mode to write mode, the writer circuitry is transitioned to a pre-write mode before the end of the read operation. The availability of a reader standby mode during write operations and a writer standby mode during read operations reduces power consumption as compared to HD systems that leave the reader circuitry in pre-read mode throughout each write operation and the writer circuitry in pre-write mode throughout each read operation.

28 Claims, 5 Drawing Sheets

HEAD-SPECIFIC STANDBY MODES FOR DISK DRIVE PREAMPLIFIERS AND THE LIKE

BACKGROUND OF THE INVENTION

1. Field of the Invention

The present invention relates to hard-disk drive systems and other recording systems, and, more specifically, to preamplifiers for such systems.

2. Description of the Related Art

Figure 1:
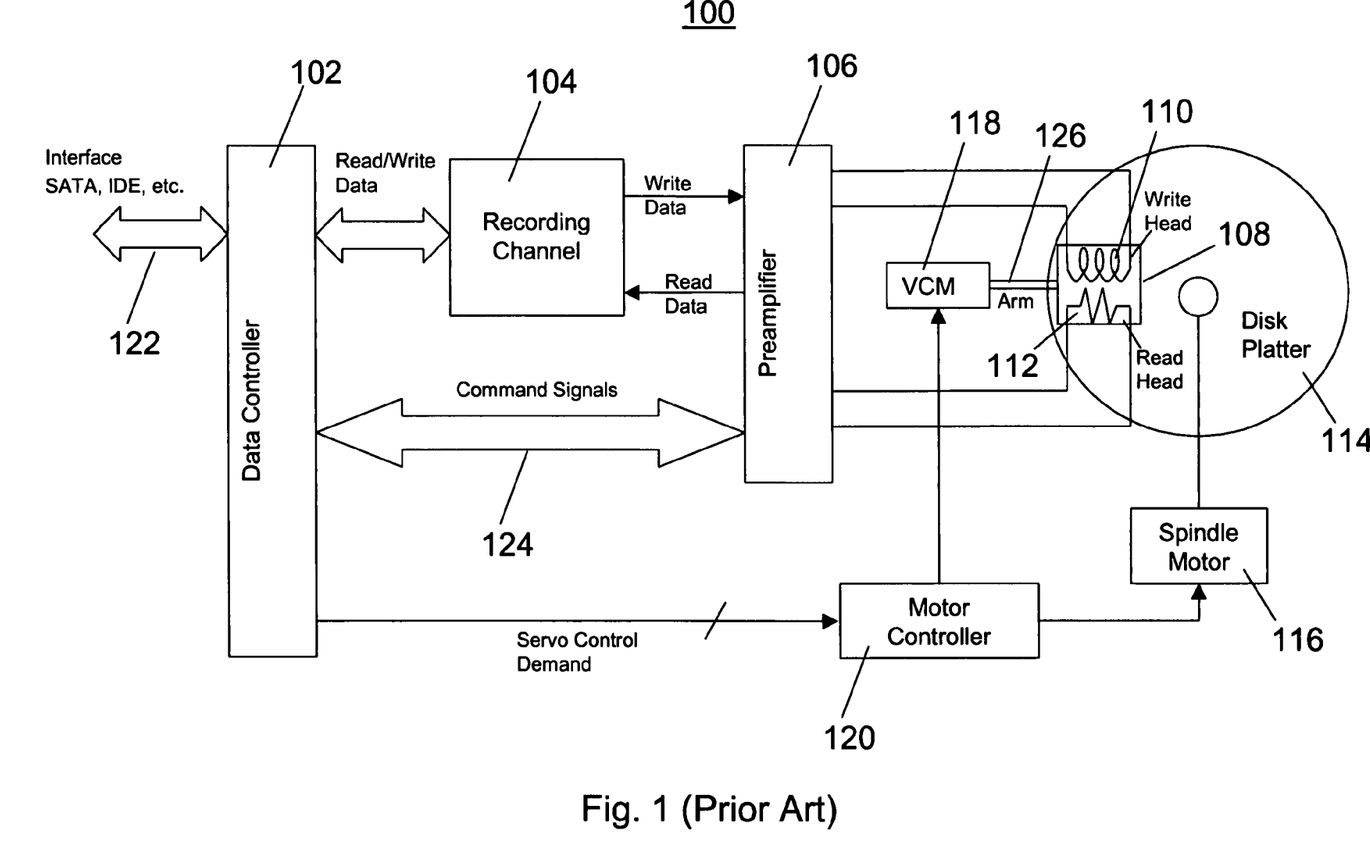
FIG. 1 shows a block diagram of a conventional hard disk drive system for writing data to and reading data from a disk platter.

FIG. 1 shows a block diagram of a conventional hard-disk (or disc) drive (HD) system 100 for writing data to and reading data from a disk platter 114. HD system 100 includes a data controller 102, a recording channel 104, a preamplifier 106, and a head assembly 108 comprising a write head 110 and a read head 112. Additionally, HD system 100 has a spindle motor 116, a voice coil motor (VCM) 118, and a motor controller 120 for controlling (1) the rotation of disk platter 114 by spindle motor 116 and (2) the radial position of head assembly 108 relative to the disk platter. Depending on storage capacity needs, HD system 100 may have multiple platters, each served by one or two additional heads.

Data controller 102 manages a number of functions in HD system 100. One function is handling the transfer of data to and from HD system 100 during read and write operations. During write operations, incoming digital data is received from external hardware through a user interface 122, such as a SATA (serial advanced technology attachment) or IDE (integrated or intelligent drive electronics) interface. Outgoing digital data is received in parallel format from recording channel 104. Both incoming and outgoing data are stored in queues in data controller 102 and scheduled for transfer operations. Outgoing data is transmitted to external hardware through user interface 122, while incoming data received from interface 122 is transmitted in parallel format to recording channel 104.

Another function of data controller 102 is the radial positioning of head assembly 108 relative to disk platter 114. Data controller 102 interprets servo data (i.e., positioning data that is prerecorded on and subsequently read from disk platter 114 by recording channel 104) and generates commands for motor controller 120 to position the head assembly.

Yet another function of data controller 102 is managing various operating modes of HD system 100. These operating modes, which are discussed later in greater detail, are triggered by data controller 102 and transmitted to preamplifier 106 via serial port lines 124.

Separate read and write functions are performed by recording channel 104. During write operations, recording channel 104 receives and modifies parallel, incoming data signals received from data controller 102. These modifications include conversion from digital to analog format, serialization, and encoding. The resulting modified data signals are then transmitted in serial format to preamplifier 106. During read operations, recording channel 104 receives and modifies serial, outgoing analog data signals from preamplifier 106. These modifications include decoding, digitization, and conversion to parallel format for transmission to data controller 102.

Preamplifier 106 also performs separate read and write functions. During write operations, preamplifier 106 receives incoming, analog data signals from recording channel 104, amplifies these signals, and transmits the resulting amplified signals to write head 110. Amplification occurs to a level that is sufficient to drive the inductive element of write head 110. During read operations, preamplifier 106 receives and amplifies small, reproduced analog data signals from read head 112 to a level sufficient for transmission to recording channel 104. In addition to data amplification and transmission, preamplifier 106 receives commands from data controller 102 via serial port lines 124 and other tags such as Write_Gate and Dummy_Select to trigger various operating modes, which will be discussed later in greater detail.

Write head 110 and read head 112 are typically separate components that are fabricated together as head assembly 108 on a single positioning arm 126. Write head 110 is typically constructed with an inductive element that produces a magnetic field when powered. Incoming analog data signals transmitted from preamplifier 106 supply sufficient power to write head 110 to generate the magnetic field. The analog signal level (e.g., high or low) determines the polarity of the magnetic field.

Read head 112 is typically constructed with a magneto-resistive (MR) element. The resistive properties of this MR head change as the magnetic field changes. A bias current is transmitted to the MR head from preamplifier 106, in order to establish head operating point for linear relation between resistance change and incident magnetic flux. As the resistive properties of the magneto-resistive element change, a corresponding change in voltage is recorded as a reproduced, or playback, analog data signal. This data signal is then transmitted from read head 112 back to preamplifier 106.

The positioning of write head 110 and read head 112 of head assembly 108 radially over disk platter 114 is performed by VCM 118. VCM 118 is driven by motor controller 120, which receives commands from data controller 102. Servo data on disk platter 114 is used to determine the location of read head 112 over disk platter 114. This data is interpreted by data controller 102, which sends positioning commands to motor controller 120. Motor controller 120 then drives VCM 118 to move head assembly 108 to the desired radial position over disk platter 114.

Disk platter 114 is a hard disk coated with a magnetic recording material. Data is written onto disk platter 114 when the recording material is altered by the magnetic field of write head 110. Data is read from disk platter 114 by read head 112, which senses changes in the magnetization of the recording material. During read operations, these sensed signals are amplified by preamplifier 106.

Rotation of disk platter 114 about its axis is accomplished by spindle motor 116. Servo data read from disk platter 114 is interpreted by data controller 102. Data controller 102 then sends commands to motor controller 120 to maintain a desired (e.g., constant) spindle motor speed.

Under normal circumstances, various operating modes are employed in HD system 100. These operating modes are triggered by data controller 102 and transmitted to preamplifier 106 individually (for time-critical signals) or using two- or three-wire serial port 124 (to reduce number of wires). Serial port 124 may, for example, use either the two-wire $I^2C$ or a three-wire synchronous protocol. The serial port permits selection of a multiplicity of operating conditions within preamplifier 106. Other lines (not shown) may be assigned variously to provide other preamplifier-specific control and status communication between data controller 102 and preamplifier 106.

Figure 2:
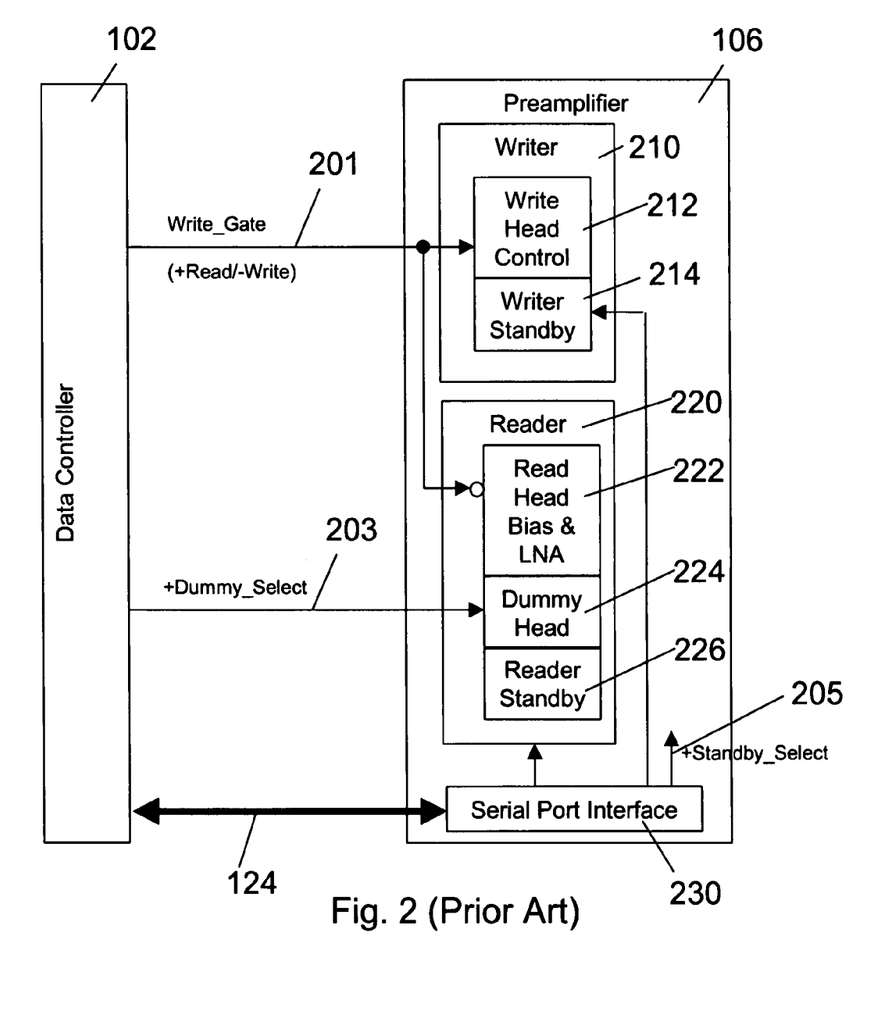
FIG. 2 shows a more-detailed block diagram of the preamplifier of FIG. 1 and some of the control signals transmitted from the data controller to the preamplifier of FIG. 1.

FIG. 2 shows a more-detailed block diagram of preamplifier 106 of FIG. 1 and some of the control signals transmitted individually or via serial port lines 124 from data controller 102 to preamplifier 106. As shown in FIG. 2, preamplifier 106 includes writer circuitry 210, reader circuitry 220, and serial port interface 230. Write_Gate 201 and Dummy_Select 203 are explicit control signals transmitted directly between the data controller 102 and preamplifier 106. Standby_Select signal 205 is transmitted via serial port 124, since state-changes on this line, unlike those on the lines for Write_Gate 201 and Dummy_Select 203, are not time-critical. Certain preamplifier designs may derive Dummy_Select 205 as a command from the serial port, in which case, the Dummy_Select line would originate not in data controller 102, but in serial port 124.

Writer 210 includes write head control circuitry 212 and writer standby circuitry 214. Write head control circuitry 212 toggles current in write head 110 of FIG. 1 during write operations. Writer standby circuitry 214 powers down writer 210 when commanded to conserve power.

Reader 220 includes read head bias and low-noise amplifier (LNA) circuitry 222, dummy (read) head 224, and reader standby circuitry 226. Read head bias and LNA circuitry 222 provides MR bias current to read head 112 of FIG. 1 during read operations, and also performs low-noise amplification of the head signal. Dummy head 224 receives bias current diverted from read head 112 during periods of read head 112 inactivity (e.g., during write operations or explicit command from data controller 102). This diversion of MR bias current is performed to prolong life of the MR head by reducing electromigration degradation. Additionally, this diversion maintains adequate power in reader 220 to allow for quick powering of read head 112 by maintaining MR bias-control feedback loops close to their setpoints. Reader standby circuitry 226 powers down reader 220 when commanded to conserve power and when there is no need for fast transitions between write and read modes. Preamplifiers not requiring extremely short write-to-read transition times may omit the dummy head function, but will nonetheless generally consume more reader power during write mode than in standby mode.

Preamplifier 106 has three writer operating modes for writer 210 of FIG. 2 (write mode, pre-write mode, and standby (or sleep) mode) and three reader operating modes for reader 220 of FIG. 2 (read mode, pre-read mode, and standby (or sleep) mode).

During write mode, writer 210 is fully powered on, with write head control circuitry 212 applying to write head 110 a data-dependent write current that drives the inductive element of write head 110. During pre-write mode, writer 210 is powered on, but no write current is applied to write head 110 by write head control circuitry 212. Nevertheless, pre-write mode consumes significant power. During standby mode, writer 210 is powered down with only a relatively small trickle current being applied to writer 210.

Similarly, during read mode, reader 220 is fully powered on, with read head bias and LNA circuitry 222 applying the read bias current to read head 112, such that analog read data is received by reader 220 from read head 112 and amplified for transmission to recording channel 104. During pre-read mode, reader 220 is powered on with read head bias and LNA circuitry 222 applying the read bias current to dummy head 224 within preamplifier 106, rather than to read head 112. This diversion of MR bias current allows for quick transitions from pre-read mode to read mode, but extracts a penalty in power consumed by reader 220. Quick transitions minimize gaps in recorded data that would otherwise decrease the storage capacity of disk platter 114. During standby mode, reader 220 is powered down with only a relatively small trickle current being applied to reader 220.

Preamplifier current consumption in pre-read and pre-write modes reflects a counter-balance between power consumption and transition times between pre-read and read mode, and between pre-write and write mode. Generally, transition times can be shortened at the expense of additional power consumption.

Table I identifies the operating modes of writer 210 and reader 220 for different values of control signals Standby_Select 205, Write_Gate 201, and Dummy_Select 203 of FIG. 2, where "1" corresponds to an asserted signal and "0" corresponds to a de-asserted signal. Note that, if Standby_Select and Write_Gate are both de-asserted, then (1) writer 210 is in write mode and (2) reader 220 is in pre-read mode, independent of the value of Dummy_Select. Similarly, if Standby_Select is asserted, then both writer 210 and reader 220 are in standby mode, independent of the values of Write_Gate and Dummy_Select.

TABLE I

PRIOR-ART PREAMPLIFIER OPERATING MODES

| Control Signals | | | Operating Modes | |
| --- | --- | --- | --- | --- |
| Standby_Select | Write_Gate (−Write/ +Read) | Dummy_Select | Writer | Reader |
| 0 | 0 | 1/0 | Write | Pre-Read |
| 0 | 1 | 0 | Pre-Write | Read |
| 0 | 1 | 1 | Pre-Write | Pre-Read |
| 1 | 1/0 | 1/0 | Standby | Standby |

For typical applications, standby mode is initiated during long periods of inactivity of preamplifier 106 by asserting Standby_Select 205. This signal is transmitted to preamplifier 106 through serial port interface 230 and applied to writer standby circuitry 214 and reader standby circuitry 226. Because of the non-time-critical nature in prior-art preamplifiers of entry into, or departure from, standby mode, it suffices to transmit the standby command through the serial port. During standby mode, writer 210 and reader 220 are both powered down to conserve power. Conserving power is very important in portable electronics and other battery-powered applications. However, a consequence of entering the power-conserving standby mode is that a relatively long transition time elapses when leaving standby mode. For this reason, prior-art readers do not enter standby mode during write operations and prior-art writers do not enter standby mode during read operations. Note that, according to Table I, if one of writer 210 and reader 220 is in standby mode, then the other is also in standby mode.

Figure 3:
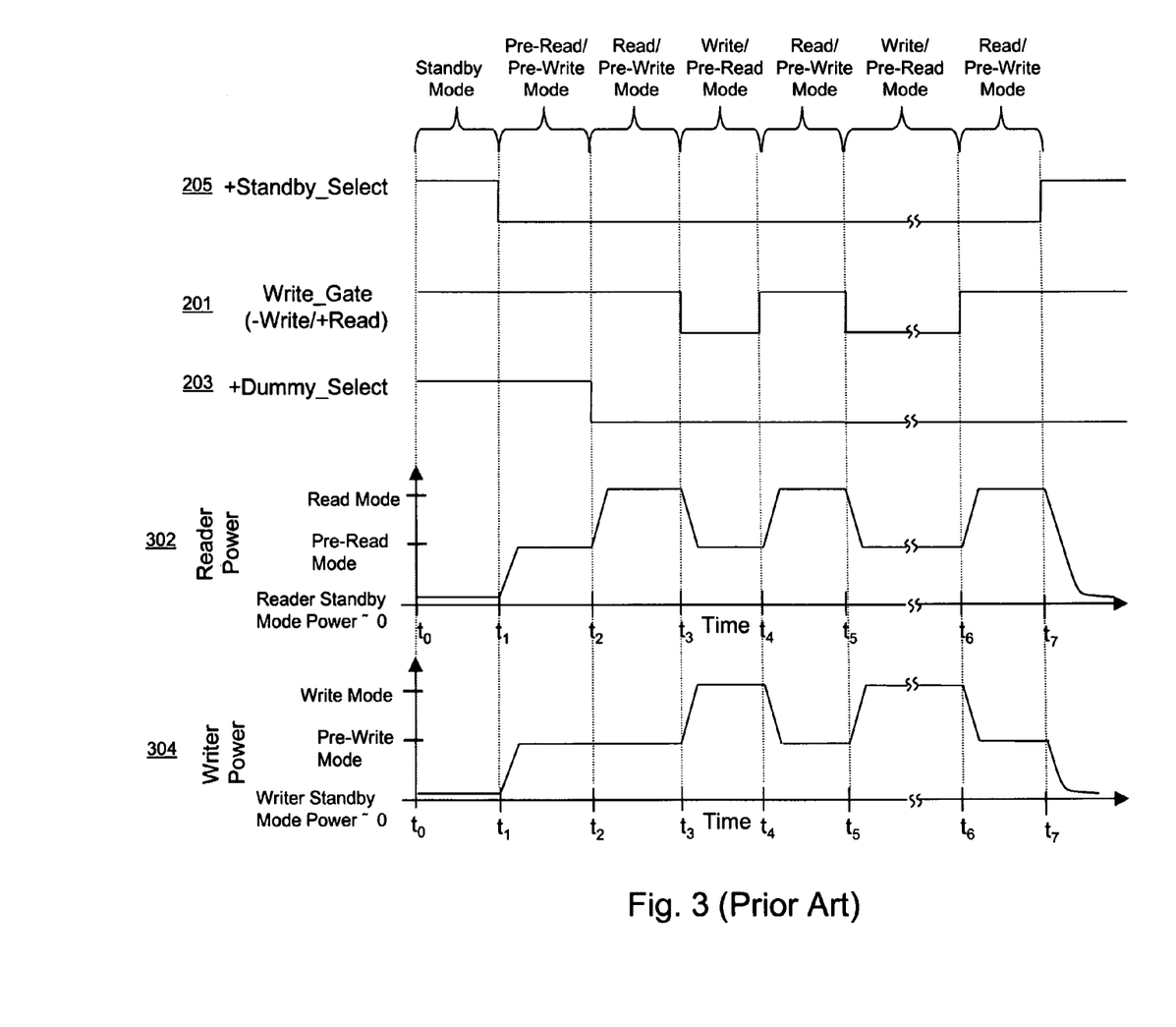
FIG. 3 graphically illustrates a possible sequence of prior-art operating modes for the preamplifier of FIG. 2.

FIG. 3 graphically illustrates a possible sequence of prior-art operating modes for preamplifier 106 of FIG. 2. The scenario depicted in FIG. 3 begins at time $t_0$ and ends at time $t_7$. FIG. 3 shows the levels of control signals Standby_Select 205, Write_Gate 201, and Dummy_Select 203 of FIG. 2, as well as the power (i.e., reader power 302) consumed by reader circuitry 220 and the power (i.e., writer power 304) consumed by writer circuitry 210 during that time span. Note that the specific power levels shown for reader power 302 and writer power 304 are intended to be qualitative, not quantitative.

It is assumed that, at the start of the scenario (i.e., at time $t_0$), preamplifier 106 has been dormant for an extended period of time and has previously entered standby mode. As such, Standby_Select 205 is shown at its asserted (i.e., high) level from time $t_0$ to time $t_1$. During this time period, reader 220 and writer 210 are almost completely powered down and receive only small trickle currents, as indicated by the low levels of both reader power 302 and writer power 304. Dummy_Select 203 and Write_Gate 201 are both asserted during this time period.

At time $t_1$, Standby_Select 205 is de-asserted, writer 210 transitions from standby mode to pre-write mode, and reader 220 transitions from standby mode to pre-read mode. Standby_Select 205 remains de-asserted until time $t_7$, when writer 210 and reader 220 both revert back to standby mode. Reader power 302 and writer power 304 increase at time $t_1$ and level off at the intermediate, pre-read and pre-write mode levels, respectively. Preamplifier 106 is now prepared for quick transitions between read mode and write mode. Note that, while reader 220 is in the pre-read mode, the read bias current is diverted from read head 112 and instead applied to dummy head 224 within preamplifier 106.

Read mode is commenced at time $t_2$, when Dummy_Select 203 is de-asserted. Note that, in read mode, the read MR bias current is applied to read head 112. Reader power 302 increases from the intermediate, pre-read mode level to the high, read mode level. Dummy_Select 203 remains de-asserted throughout the rest of the scenario of FIG. 3.

At time $t_3$, Write_Gate 201 is de-asserted, writer 210 transitions to write mode, and reader 220 returns to pre-read mode, in which the read bias current is again diverted to dummy head 224. Reader power 302 decreases to the intermediate, pre-read mode level, and writer power 304 increases to the high, write mode level. A quick transition from write mode to read mode may now occur.

The sequencing at time $t_4$ illustrates this quick transition from write to read. At time $t_4$, Write_Gate 201 is asserted, thereby switching writer 210 back to pre-write mode and reader 220 back to read mode.

From time $t_5$ to time $t_6$, an extended write operation occurs (as indicated by the break in each graph). In particular, at time $t_5$, Write_Gate 201 is de-asserted to switch writer 210 back to write mode and reader 220 back to pre-read mode. At time $t_6$, Write_Gate 201 is asserted to switch writer 210 back to pre-write mode and reader 220 back to read mode.

At time $t_7$, Standby_Select 205 is re-asserted to switch both writer 210 and reader 220 to the low-power standby mode.

SUMMARY OF THE INVENTION

In one embodiment, the present invention is a recording system for writing incoming data to and reading outgoing data from a recording medium. The system comprises a write head, a read head, writer circuitry, reader circuitry, and a controller. The write head generates a magnetic field to magnetize the recording medium based on the incoming data for writing to, and storage on, the recording medium; and the read head senses a magnetic field previously imparted to the recording medium corresponding to the data being reproduced from the recording medium. The writer circuitry amplifies incoming signals corresponding to the incoming data for application to the write head, and the reader circuitry amplifies outgoing signals generated by the read head corresponding to the outgoing data. The controller controls operations of the writer circuitry and the reader circuitry. At least one of the writer circuitry and the reader circuitry supports (1) a low-power mode in which said circuitry is powered at to a low power level, (2) an intermediate-power mode in which said circuitry is powered at to an intermediate power level, and (3) a full-power mode in which said circuitry is powered at to a full power level. During a full-power operation of the other said circuitry, said circuitry is adapted to be in either the low-power mode or the intermediate-power mode, as selected by the controller.

In another embodiment, the present invention is a controller for such a recording system.

In yet another embodiment, the present invention is writer circuitry for such a recording system, where the writer circuitry supports (1) a low-power mode in which the writer circuitry is powered at to a low power level, (2) an intermediate-power mode in which the writer circuitry is powered at to an intermediate power level, and (3) a full-power mode in which the writer circuitry is powered at to a full power level. During a full-power read operation of the reader circuitry, the writer circuitry is adapted to be in either the low-power mode or the intermediate-power mode, as selected by the controller.

In yet another embodiment, the present invention is reader circuitry for such a recording system, where the reader circuitry supports (1) a low-power mode in which the reader circuitry is powered at to a low power level, (2) an intermediate-power mode in which the reader circuitry is powered at to an intermediate power level, and (3) a full-power mode in which the reader circuitry is powered at to a full power level. During a full-power write operation of the writer circuitry, the reader circuitry is adapted to be in either the low-power mode or the intermediate-power mode, as selected by the controller.

In still another embodiment, the present invention is a method for controlling such a recording system, in which at least one of the writer circuitry and the reader circuitry is controlled to be in either the low-power mode or the intermediate-power mode, as selected by the controller, during a full-power operation of the other circuitry.

In yet another embodiment, the present invention is a method for operating a recording system having reader circuitry and writer circuitry. The method comprises (a) configuring one of the reader and writer circuitry for full-power operation; (b) configuring the other circuitry into a low-power mode during a first interval of the full-power operation of the one circuitry; (c) configuring the other circuitry into an intermediate-power mode during a second interval of the full-power operation of the one circuitry subsequent to the first interval; (d) transitioning the one circuitry from the full-power operation to a non-full-power operation; and (e) configuring the other circuitry into a full-power mode at the end of the full-power operation of the one circuitry.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

As indicated in FIG. 3, during the extended write operation from time $t_5$ to time $t_6$, reader circuitry 220 in preamplifier 106 is maintained in pre-read mode with reader power 302 at the intermediate, pre-read mode level. According to certain embodiments of the present invention, reader 220 can be powered down in a reader standby mode that is independent of whether or not writer circuitry 210 in preamplifier 106 is also powered down. Reader 220 can be controlled to enter this reader standby mode during a relatively long write operation in order to save power and then to transition to the conventional pre-read mode just prior to the end of the write operation to be ready for a quick transition to read mode.

Alternatively or in addition, in certain embodiments of the present invention, writer circuitry 210 can be powered down in a writer standby mode that is independent of whether or not reader circuitry 220 is also powered down. Writer 210 can be controlled to enter this writer standby mode during a relatively long read operation in order to save power and then to transition to the conventional pre-write mode just prior to the end of the read operation to be ready for a quick transition to write mode.

Figure 4:
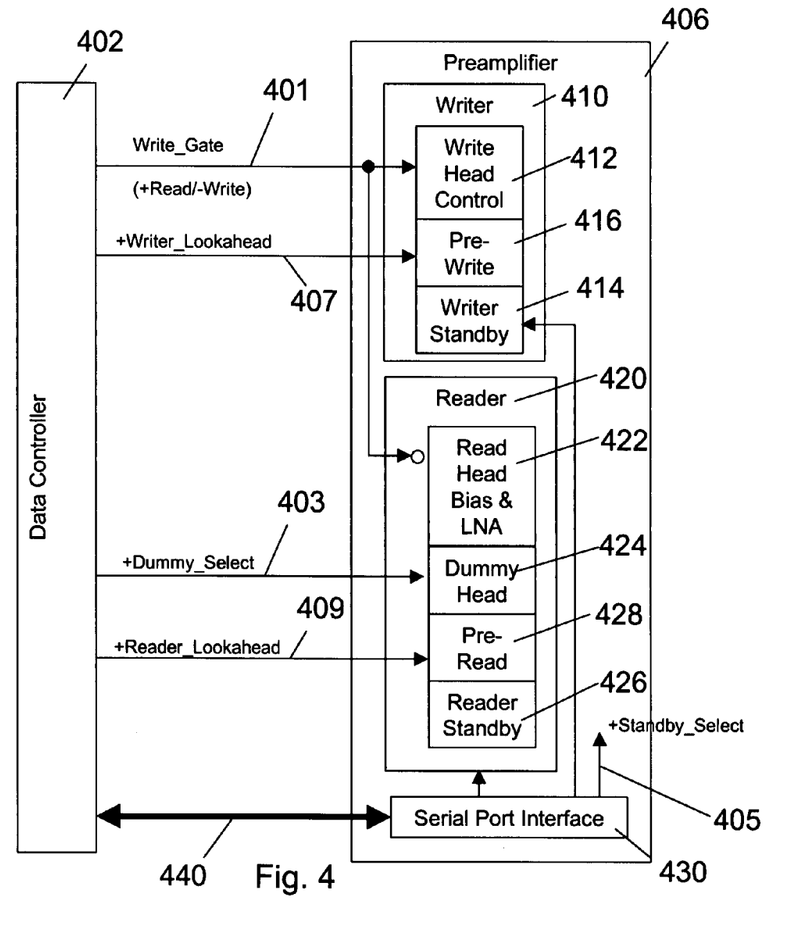
FIG. 4 shows a block diagram of a data controller and a preamplifier for a hard disk drive system, according to one embodiment of the present invention.

FIG. 4 shows a block diagram of a data controller 402 and a preamplifier 406 for a hard-disk drive system, according to one embodiment of the present invention. Data controller 402 and preamplifier 406 can be used in place of data controller 102 and preamplifier 106 of HD system 100 of FIG. 1 to form an exemplary HD system of the present invention.

Similar to preamplifier 106 of FIG. 2, preamplifier 406 has writer circuitry 410, reader circuitry 420, and serial port interface 430. Serial port interface 430 converts information received on serial port 440 to parallel form for use within preamplifier 406. Serial port interface 430 may also serialize internal preamplifier status for presentation to data controller 402 via serial port 440. Like writer 210 of FIG. 2, writer 410 has write head control circuitry 412 and writer standby circuitry 414, and, like reader 220 of FIG. 2, reader 420 has read head bias and LNA circuitry 422, dummy head 424, and reader standby circuitry 426. These components of writer 410 and reader 420 are analogous to the corresponding components of writer 210 and reader 220 of FIG. 2, respectively. In addition, however, writer 410 includes pre-write circuitry 416, and reader 420 includes pre-read circuitry 428. These new elements will be described in further detail later in this specification.

Analogous to data controller 102 of FIG. 2, data controller 402 issues explicit control signals Write_Gate 401 and Dummy_Select 403 to preamplifier 406. As in preamplifier 106 of FIG. 2, Standby_Select 405 may be derived from serial port interface 430 owing to the non-time-critical nature of that control signal. Other lines (not shown) are assigned variously to provide other preamplifier-specific control and status communication between data controller 402 and preamplifier 406.

In addition, however, data controller 402 also provides (1) control signal Writer_Look ahead 407 to pre-write circuitry 416 of writer 410 and (2) control signal Reader_Lookahead 409 to pre-read circuitry 428 of reader 420. These two additional signals can be generated explicitly or decoded from (unused) states of other reader control signals.

Preamplifier 406 has four operating modes for writer 410 (write mode, pre-write mode, preamplifier standby mode, and writer standby mode) and four operating modes for reader 420 (read mode, pre-read mode, preamplifier standby mode, and reader standby mode). Write mode, pre-write mode, read mode, pre-read mode, and preamplifier standby mode are analogous to the corresponding modes of preamplifier 106. The two new modes are (1) writer standby mode, in which writer circuitry 410 is powered down, independent of the operating mode for reader circuitry 420 and (2) reader standby mode, in which reader 420 is powered down, independent of the operating mode for writer circuitry 410. Note that, unlike read mode in which reader 420 generates and applies a MR bias current to the read head and provides low-noise amplification of the read signal transduced from the MR head, and unlike pre-read mode in which reader 420 generates and applies the read bias current to dummy head 424, during reader standby mode, reader 420 does not consume any significant current.

Table II identifies the operating modes of writer 410 and reader 420 for different values of control signals Standby_Select 405, Write_Gate 401, Dummy_Select 403, Writer_Lookahead 407, and Reader_Lookahead 409, where "1" corresponds to an asserted signal and "0" corresponds to a de-asserted signal. Similar to Table I, if Standby_Select 405 is asserted, then both writer 410 and reader 420 are in preamplifier standby mode, independent of the values of the other control signals.

TABLE II

EXEMPLARY PREAMPLIFIER OPERATING MODES OF THE INVENTION

| Control Signals | | | | | Operating Modes | |
|---|---|---|---|---|---|---|
| Standby Select | Write Gate (−Write/+Read) | Dummy Select | Writer Lookahead | Reader Lookahead | Writer | Reader |
| 0 | 0 | 1/0 | 1/0 | 1 | Write | Pre-Read |
| 0 | 0 | 1/0 | 1/0 | 0 | Write | Reader Standby |
| 0 | 1 | 0 | 1 | 1 | Pre-Write | Read |
| 0 | 1 | 0 | 1 | 0 | Pre-Write | Reader Standby |
| 0 | 1 | 0 | 0 | 1 | Writer Standby | Read |
| 0 | 1 | 0 | 0 | 0 | Writer Standby | Reader Standby |
| 0 | 1 | 1 | 1 | 1 | Pre-Write | Pre-Read |
| 0 | 1 | 1 | 1 | 0 | Pre-Write | Reader Standby |
| 0 | 1 | 1 | 0 | 1 | Writer Standby | Pre-Read |
| 0 | 1 | 1 | 0 | 0 | Writer Standby | Reader Standby |
| 1 | 1/0 | 1/0 | 1/0 | 1/0 | Preamp (Reader & Writer) Standby | Preamp (Reader & Writer) Standby |

Comparing Tables I and II, when writer 410 is in write mode, Reader_Lookahead 409 determines whether reader 420 is in pre-read mode or reader standby mode. Similarly, when reader 420 is in read mode, Writer_Lookahead 407 determines whether writer 410 is in pre-write mode or writer standby mode. As shown in Table II, the Reader_Lookahead and Writer_Lookahead control signals enable other combinations of operating modes for writer 410 and reader 420 that are not supported by prior-art preamplifier 106 of FIG. 1 (e.g., pre-write and reader standby, writer standby and read, writer standby and pre-read).

The ability to individually transition writer 410 and/or reader 420 to their respective standby modes enables greater conservation of power. Moreover, appropriate timing of transitions to and from the writer and reader standby modes enables decreased average power consumption, while maintaining quick transitions from the end of a write operation to the beginning of an immediately subsequent read operation, and vice versa. For example, during a long write operation, the Reader_Lookahead control signal can be de-asserted to transition reader 420 to reader standby mode and then asserted just prior to the end of the write operation to transition reader 420 to pre-read mode in time for a quick transition (within 50 nanoseconds, for example) to read mode at the end of the write operation. Similarly, during a long read operation, the Writer_Lookahead control signal can be de-asserted to transition writer 410 to writer standby mode and then asserted just prior to the end of the read operation to transition writer 410 to pre-write mode in time for a quick transition to write mode at the end of the read operation. Importantly, this embodiment of the invention relieves the prior-art tradeoff between pre-read and pre-write mode power, and the transition times between pre-read and read and between pre-write and write. Power in pre-read and pre-write modes can be increased as necessary to lower mode-recovery times without significant effect on average preamplifier power, since the duty-cycle of pre-read and pre-write modes is relatively low. The time elapsing from de-assertion of a lookahead signal, to a state change in Write_Gate is preferably sufficient (one microsecond, for example) for the reader or writer to attain equilibrium in the pre-read or pre-write state.

Figure 5:
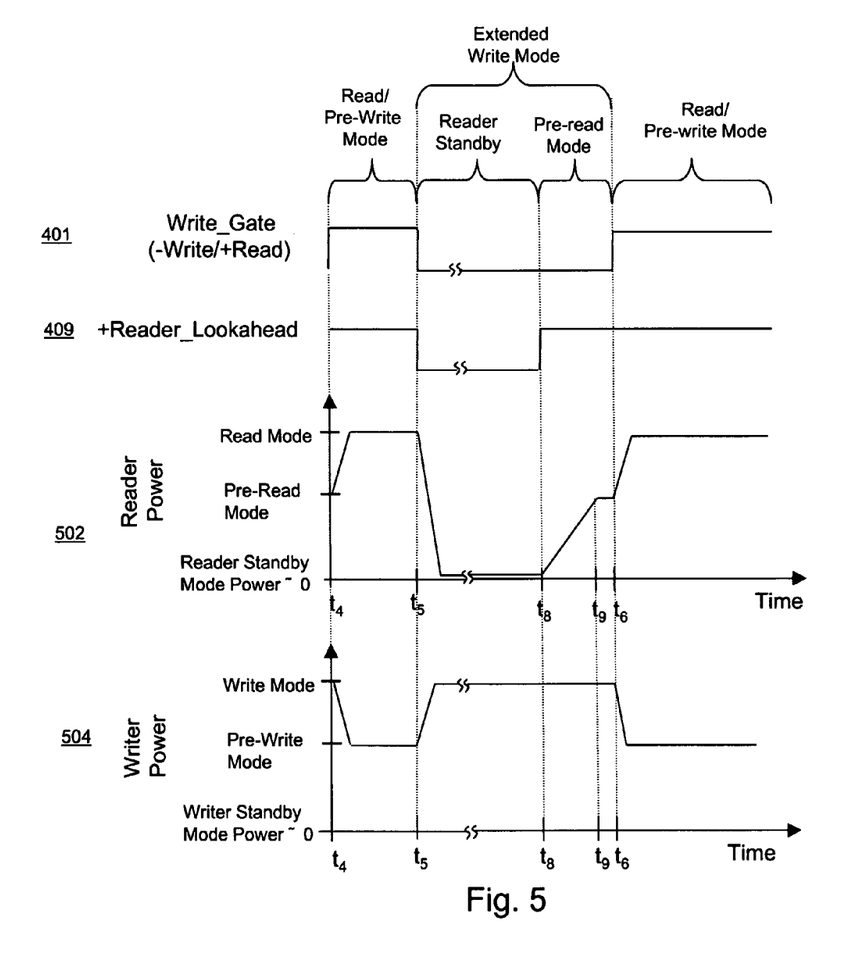
FIG. 5 graphically illustrates a possible sequence of operating modes for the preamplifier of FIG. 4 for the time period corresponding to time $t_4$ to time $t_6$ of FIG. 3.

FIG. 5 graphically illustrates a possible sequence of operating modes for preamplifier 406 of FIG. 4 for the time period corresponding to time $t_4$ to time $t_6$ of FIG. 3. As described in the context of FIG. 3, this time period corresponds to a read operation from time $t_4$ to time $t_5$ followed by an extended write operation from time $t_5$ to time $t_6$. FIG. 5 shows the levels of control signals Write_Gate 401 and Reader_Lookahead 409 of FIG. 4, as well as the power (i.e., reader power 502) consumed by reader circuitry 420 and the power (i.e., writer power 504) consumed by writer circuitry 410 during that time span. Note that, during this time period, although not shown in FIG. 5, Standby_Select 405 and Dummy_Select 403 are de-asserted, and Writer_Lookahead 407 is asserted.

As in FIG. 3, at time $t_4$, Write_Gate 401 is asserted, thereby switching writer 410 to pre-write mode and reader 420 to read mode.

In the scenario of FIG. 3, at time $t_5$, when the writer circuitry transitions to write mode, the reader circuitry transitions to pre-read mode, where it remains until the end of the write operation at time $t_6$ while consuming significant power. In the scenario of FIG. 5, rather than have reader 420 stay in pre-read mode during the entire write operation, at time $t_5$, in addition to de-asserting Write_Gate 401, Reader_Lookahead 409 is also de-asserted in order to transition reader 420 to reader standby mode, at which reader power 502 is at its low power, standby mode level.

At time $t_8$, Reader_Lookahead 409 is asserted, to transition reader 420 to pre-read mode. As shown in FIG. 5, the reader power 502 rises from the low, standby mode level at time $t_8$ associated with reader standby mode to the intermediate, pre-read mode level at time $t_9$, as the circuitry within reader 420 powers up. The timing of the assertion of Reader_Lookahead 409 (i.e., time $t_8$) is selected such that the power-up of reader 420 to the pre-read mode level is completed (i.e., at time $t_9$), just prior to the end of the write operation at time $t_6$, at which time Write_Gate 401 is re-asserted to provide a quick transition from pre-read mode to read mode.

By transitioning reader 420 to reader standby mode during all but the very end of the write operation between times $t_5$ and $t_6$, the total power consumed is reduced without affecting the timing of the quick transition to read mode following the end of the write operation.

Although not explicitly depicted in the figures, control signal Writer_Lookahead 407 can be used in an analogous manner to reduce the power consumed by writer 410 during long read operations by transitioning writer 410 to writer standby mode and then transitioning writer 410 to pre-write mode just prior to the end of the read operation to be ready for a quick transition from read mode to write mode. As noted earlier, constraints on power in the pre-read and pre-write modes are considerably relaxed in certain embodiments of the invention.

In one possible implementation of the circuitry of FIG. 4, Writer_Lookahead 407 and Reader_Lookahead 409 may be transmitted explicitly from data controller 402 to preamplifier 406 using two pairs of pins that have no corresponding pins in prior-art HD system 100 of FIG. 1.

Alternatively, to the extent possible, these two control signals may be time-multiplexed with other signals transmitted between the data controller and the preamplifier, e.g., using pins and/or unused states that are already defined in the prior-art circuitry. For example, as shown in Table II, when Write_Gate is de-asserted such that writer 210 is in write mode, the Writer_Lookahead control signal is not used. As such, Writer_Lookahead can be time-multiplexed with some other (e.g., conventional) signal that is used only during write mode.

Other embodiments of the present invention may be implemented without using explicit Writer_Lookahead and/or Reader_Lookahead control signals. Instead, existing signals may be pulsed at an appropriate time just prior to transitioning between modes. Several methods exist for implementing such embodiments. For example, data controller 402 could assert Write_Gate 401 in advance of the completion of a write operation (e.g., at lookahead time $t_8$ of FIG. 5) to trigger transition of reader 420 from reader standby mode to pre-read mode. Meanwhile, a precise timer implemented in preamplifier 406 would artificially extend the end of write mode (e.g., from time $t_8$ to time $t_6$) internal to the preamplifier in order to complete the write operation. Likewise, Write_Gate 401 may be de-asserted just prior to completion of a read operation to power writer 410, with a timer artificially extending the end of read mode. Lack of timer precision translates into more overhead on the recording disk; it is possible to contemplate an automatic timer calibration mode utilizing, for example, the synchronous serial port clock for this purpose.

In another implementation, data controller 402 may pulse the Enable signal (not shown in the figures) of the preamplifier's serial port and serial port interface 430. This signal may be pulsed at a lookahead time or may be stored in a register associated with serial port interface 430 and strobed forward at the lookahead time. Pulsing of the Enable line would power either writer 410 or reader 420. This option is available when a dedicated port on data controller 402 is used to transmit signals to serial port interface 430.

In other implementations, other signals that are used only in read mode or only in write mode could be pulsed at the lookahead time.

Although the present invention has been described in the context of a data controller and a preamplifier that support both writer and reader standby modes, the present invention can also be implemented in the context of circuitry that supports only writer standby mode or only reader standby mode. It will be appreciated that this invention makes possible extension of battery lifetime in portable electronics containing disk drives. The invention can minimize thermal stress of preamplifier electronics, thus prolonging disk drive lifetime. In addition, the invention can be used to improve the write-to-read and/or read-to-write recovery times by enabling more power to be applied during the pre-read and/or pre-write modes, thus improving on the format efficiency of the disk drive.

Although the present invention has been described in the context of a write head having an inductive element and a read head having a magneto-resistive element, the present invention can also be implemented in the context of other types of write heads and/or read heads having other types of writing and reading elements that generate and sense appropriate electromagnetic (EM) fields.

Although the present invention has been described in the context of a hard-disk drive system, the present invention can be implemented in the context of any suitable recording system, such as those for which fast transitions from read mode to write mode and/or vice versa are desirable. In addition to HD systems, recording systems in which the present invention can be implemented include, but are not necessarily limited to, tape units that employ a motor-driven spinning head to attain head-to-tape velocity with linear tape speed, such as DVR, helical-scan recording, and fixed, multiple-head systems.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A recording system for writing incoming data to and reading outgoing data from a recording medium, the system comprising:
   a write head adapted to generate an electromagnetic (EM) field based on the incoming data for writing to the recording medium;
   a read head adapted to sense an EM field corresponding to the outgoing data for reading from the recording medium;
   writer circuitry adapted to amplify incoming signals corresponding to the incoming data for application to the write head;
   reader circuitry adapted to amplify outgoing signals generated by the read head corresponding to the outgoing data; and
   a controller adapted to control operations of the writer circuitry and the reader circuitry, wherein:
     first circuitry being one of the writer circuitry and the reader circuitry supports (1) a low-power mode in which said first circuitry is powered at a low power level, (2) an intermediate-power mode in which said first circuitry is powered at an intermediate power level, and (3) a full-power mode in which said first circuitry is powered at a full power level;
     if said first circuitry is the writer circuitry, then second circuitry is the reader circuitry, and vice versa;
     during a full-power operation of said second circuitry, said first circuitry is adapted to be in either the low-power mode or the intermediate-power mode, as selected by the controller; and
     the controller is adapted to:
       transition said first circuitry to the low-power mode at the beginning of the full-power operation of said second circuitry; and
       transition said first circuitry to the intermediate-power mode at the end of the full-power operation of said second circuitry.

2. The recording system of claim 1, wherein the writer circuitry and the reader circuitry are part of a preamplifier of the system.

3. The recording system of claim 1, wherein:
   said first circuitry is the reader circuitry;
   the low-power mode is a reader standby mode in which the reader circuitry is powered at the low power level;
   the intermediate-power mode is a pre-read mode in which the reader circuitry is powered at the intermediate power level;
   the full-power mode is a read mode in which the reader circuitry is powered at the full power level; and
   the reader circuitry is adapted to be in either the reader standby mode or the pre-read mode during a full-power write operation of the writer circuitry.

4. The recording system of claim 3, wherein:
the reader circuitry comprises a dummy head;
during the read mode, the reader circuitry applies a read bias current to the read head;
during the pre-read mode, the reader circuitry applies the read bias current to the dummy head; and
during the reader standby mode, the reader circuitry does not generate any significant read bias current.

5. The recording system of claim 3, wherein the controller is adapted to:
transition the reader circuitry to the reader standby mode at the beginning of the full-power write operation of the writer circuitry; and
transition the reader circuitry to the pre-read mode at the end of the full-power write operation of the writer circuitry.

6. The recording system of claim 1, wherein:
said first circuitry is the writer circuitry;
the low-power mode is a writer standby mode in which the writer circuitry is powered at the low power level;
the intermediate-power mode is a pre-write mode in which the writer circuitry is powered at the intermediate power level;
the full-power mode is a write mode in which the writer circuitry is powered at the full power level; and
the writer circuitry is adapted to be in either the writer standby mode or the pre-write mode during a full-power read operation of the reader circuitry.

7. The recording system of claim 6, wherein the controller is adapted to:
transition the writer circuitry to the writer standby mode at the beginning of the full-power read operation of the reader circuitry; and
transition the writer circuitry to the pre-write mode at the end of the full-power read operation of the reader circuitry.

8. The recording system of claim 1, wherein the controller is adapted to transmit a lookahead control signal to said first circuitry to cause said first circuitry to transition from the low-power standby mode to the intermediate-power mode prior to the end of the full-power operation of said second circuitry.

9. The recording system of claim 8, wherein the lookahead control signal is time-multiplexed with another signal transmitted between the controller and said first circuitry.

10. The recording system of claim 1, wherein:
the writer circuitry and the reader circuitry are part of a preamplifier of the system;
said first circuitry is the reader circuitry;
the low-power mode is a reader standby mode in which the reader circuitry is powered at the low power level;
the intermediate-power mode is a pre-read mode in which the reader circuitry is powered at the intermediate power level;
the full-power mode is a read mode in which the reader circuitry is powered at the full power level;
the reader circuitry is adapted to be in either the reader standby mode or the pre-read mode during a full-power write operation of the writer circuitry;
the reader circuitry comprises a dummy head;
during the read mode, the reader circuitry applies a read bias current to the read head;
during the pre-read mode, the reader circuitry applies the read bias current to the dummy head;
during the reader standby mode, the reader circuitry does not generate any significant read bias current;
the controller is adapted to:
transition the reader circuitry to the reader standby mode at the beginning of the full-power write operation of the writer circuitry; and
transition the reader circuitry to the pre-read mode at the end of the full-power write operation of the writer circuitry; and
the controller is adapted to transmit a reader lookahead control signal to the reader circuitry to cause the reader circuitry to transition from the low-power reader standby mode to the intermediate-power pre-read mode prior to the end of the full-power write operation of the writer circuitry.

11. The recording system of claim 10, wherein the lookahead control signal is time-multiplexed with another signal transmitted between the controller and said first circuitry.

12. The recording system of claim 10, wherein:
the writer circuitry has (1) a low-power writer standby mode in which the writer circuitry is powered at a low power level, (2) an intermediate-power pre-write mode in which the writer circuitry is powered at an intermediate power level, and (3) a full-power write mode in which the writer circuitry is powered at a full power level;
the writer circuitry is adapted to be in either the writer standby mode or the pre-write mode during a full-power read operation of the reader circuitry;
the controller is adapted to:
transition the writer circuitry to the writer standby mode at the beginning of the full-power read operation of the reader circuitry; and
transition the writer circuitry to the pre-write mode at the end of the full-power read operation of the reader circuitry; and
the controller is adapted to transmit a writer lookahead control signal to the writer circuitry to cause the writer circuitry to transition from the low-power writer standby mode to the intermediate-power pre-write mode prior to the end of the full-power read operation of the reader circuitry.

13. The recording system of claim 1, further comprising a timer adapted to be used to determine when to transition said first circuitry from the low-power standby mode to the intermediate-power mode prior to the end of the full-power operation of said second circuitry.

14. A controller for a recording system for writing incoming data to and reading outgoing data from a recording medium, the system further comprising:
a write head adapted to generate an EM field based on the incoming data for writing to the recording medium;
a read head adapted to sense an EM field corresponding to the outgoing data for reading from the recording medium;
writer circuitry adapted to amplify incoming signals corresponding to the incoming data for application to the write head; and
reader circuitry adapted to amplify outgoing signals generated by the read head corresponding to the outgoing data, wherein:
the controller is adapted to control operations of the writer circuitry and the reader circuitry;
first circuitry being one of the writer circuitry and the reader circuitry supports (1) a low-power mode in which said first circuitry is powered at a low power level, (2) an intermediate-power mode in which said first circuitry is powered at an intermediate power level, and (3) a full-power mode in which said first circuitry is powered at a full power level;

if said first circuitry is the writer circuitry, then second circuitry is the reader circuitry, and vice versa;

during a full-power operation of said second circuitry, said first circuitry is adapted to be in either the low-power mode or the intermediate-power mode, as selected by the controller; and the controller is adapted to:

transition said first circuitry to the low-power mode at the beginning of the full-power operation of said second circuitry; and transition said first circuitry to the intermediate-power mode at the end of the full-power operation of said second circuitry.

15. Writer circuitry for a recording system for writing incoming data to and reading outgoing data from a recording medium, the system further comprising:

a write head adapted to generate an EM field based on the incoming data for writing to the recording medium;

a read head adapted to sense an EM field corresponding to the outgoing data for reading from the recording medium;

reader circuitry adapted to amplify outgoing signals generated by the read head corresponding to the outgoing data; and a controller adapted to control operations of the writer circuitry and the reader circuitry, wherein:

the writer circuitry supports (1) a low-power mode in which the writer circuitry is powered at a low power level, (2) an intermediate-power mode in which the writer circuitry is powered at an intermediate power level, and (3) a full-power mode in which the writer circuitry is powered at a full power level;

during a full-power read operation of the reader circuitry, the writer circuitry is adapted to be in either the low-power mode or the intermediate-power mode, as selected by the controller; and the writer circuitry is adapted to:

transition to the low-power mode at the beginning of the full-power read operation of the reader circuitry; and transition to the intermediate-power mode at the end of the full-power read operation of the reader circuitry.

16. The writer circuitry of claim 15, wherein:

the writer circuitry is part of a preamplifier of the system; and the preamplifier further comprises the reader circuitry.

17. Reader circuitry for a recording system for writing incoming data to and reading outgoing data from a recording medium, the system further comprising:

a write head adapted to generate an EM field based on the incoming data for writing to the recording medium;

a read head adapted to sense an EM field corresponding to the outgoing data for reading from the recording medium;

writer circuitry adapted to amplify incoming signals corresponding to the incoming data for application to the write head; and a controller adapted to control operations of the writer circuitry and the reader circuitry, wherein:

the reader circuitry supports (1) a low-power mode in which the reader circuitry is powered at a low power level, (2) an intermediate-power mode in which the reader circuitry is powered at an intermediate power level, and (3) a full-power mode in which the reader circuitry is powered at a full power level;

during a full-power write operation of the writer circuitry, the reader circuitry is adapted to be in either the low-power mode or the intermediate-power mode, as selected by the controller; and the reader circuitry is adapted to:

transition to the low-power mode at the beginning of the full-power write operation of the writer circuitry; and transition to the intermediate-power mode at the end of the full-power write operation of the writer circuitry.

18. The reader circuitry of claim 17, wherein:

the reader circuitry is part of a preamplifier of the system; and the preamplifier further comprises the writer circuitry.

19. A method for operating a recording system comprising:

a write head adapted to generate an electromagnetic (EM) field based on the incoming data for writing to the recording medium;

a read head adapted to sense an EM field corresponding to the outgoing data for reading from the recording medium;

writer circuitry adapted to amplify incoming signals corresponding to the incoming data for application to the write head;

reader circuitry adapted to amplify outgoing signals generated by the read head corresponding to the outgoing data; and a controller adapted to control operations of the writer circuitry and the reader circuitry, wherein:

first circuitry being one of the writer circuitry and the reader circuitry supports (1) a low-power mode in which said first circuitry is powered at a low power level, (2) an intermediate-power mode in which said first circuitry is powered at an intermediate power level, and (3) a full-power mode in which said first circuitry is powered at a full power level; and if said first circuitry is the writer circuitry, then second circuitry is the reader circuitry, and vice versa, the method comprising:

controlling said first circuitry to be in either the low-power mode or the intermediate-power mode, as selected by the controller, during a full-power operation of said second circuitry, wherein the controller:

transitions said first circuitry to the low-power mode at the beginning of the full-power operation of said second circuitry; and transitions said first circuitry to the intermediate-power mode at the end of the full-power operation of said second circuitry.

20. The method of claim 19, wherein:

said first circuitry is the reader circuitry;

the low-power mode is a reader standby mode in which the reader circuitry is powered at the low power level;

the intermediate-power mode is a pre-read mode in which the reader circuitry is powered at the intermediate power level;

the full-power mode is a read mode in which the reader circuitry is powered at the full power level; and the reader circuitry is controlled to be in either the reader standby mode or the pre-read mode during a full-power write operation of the writer circuitry.

21. The method of claim 20, wherein:
the reader circuitry comprises a dummy head;
during the read mode, the reader circuitry applies a read bias current to the read head;
during the pre-read mode, the reader circuitry applies the read bias current to the dummy head; and
during the reader standby mode, the reader circuitry does not generate any significant read bias current.

22. The method of claim 20, wherein the controller:
transitions the reader circuitry to the reader standby mode at the beginning of the full-power write operation of the writer circuitry; and
transitions the reader circuitry to the pre-read mode at the end of the full-power write operation of the writer circuitry.

23. The method of claim 19, wherein:
said first circuitry is the writer circuitry;
the low-power mode is a writer standby mode in which the writer circuitry is powered at the low power level;
the intermediate-power mode is a pre-write mode in which the writer circuitry is powered at the intermediate power level;
the full-power mode is a write mode in which the writer circuitry is powered at the full power level; and
the writer circuitry is controlled to be in either the writer standby mode or the pre-write mode during a full-power read operation of the reader circuitry.

24. The method of claim 23, wherein the controller:
transitions the writer circuitry to the writer standby mode at the beginning of the full-power read operation of the reader circuitry; and
transitions the writer circuitry to the pre-write mode at the end of the full-power read operation of the reader circuitry.

25. The method of claim 19, wherein the controller transmits a lookahead control signal to said first circuitry to cause said first circuitry to transition from the low-power standby mode to the intermediate-power mode prior to the end of the full-power operation of said second circuitry.

26. A method for operating a recording system having reader circuitry and writer circuitry, the method comprising:

(a) configuring one of the reader and writer circuitry for full-power operation;
(b) configuring the other circuitry into a low-power mode during a first interval of the full-power operation of the one circuitry;
(c) configuring the other circuitry into an intermediate-power mode during a second interval of the full-power operation of the one circuitry subsequent to the first interval;
(d) transitioning the one circuitry from the full-power operation to a non-full-power operation; and
(e) configuring the other circuitry into a full-power mode at the end of the full-power operation of the one circuitry.

27. The method of claim 26, wherein:
the one circuitry is the writer circuitry;
the other circuitry is the reader circuitry;
the low-power mode is a reader standby mode;
the intermediate-power mode is a pre-read mode;
the full-power mode is a read mode;
step (a) comprises configuring the writer circuitry into a full-power write mode;
step (d) comprises transitioning the writer circuitry from the full-power write mode to a mode other than the full-power write mode; and
step (e) comprises configuring the reader circuitry into the read mode at the end of the full-power write mode of the writer circuitry.

28. The method of claim 26, wherein:
the one circuitry is the reader circuitry;
the other circuitry is the writer circuitry;
the low-power mode is a writer standby mode;
the intermediate-power mode is a pre-write mode;
the full-power mode is a write mode;
step (a) comprises configuring the reader circuitry into a full-power read mode;
step (d) comprises transitioning the reader circuitry from the full-power read mode to a mode other than the full-power read mode; and
step (e) comprises configuring the writer circuitry into the write mode at the end of the full-power read mode of the reader circuitry.

* * * * *